United States Patent [19]
Kimura et al.

[11] Patent Number: 5,988,674
[45] Date of Patent: Nov. 23, 1999

[54] AIR BAG APPARATUS

[75] Inventors: Takao Kimura; Hidetsugu Okazaki; Hidetoshi Utsumi, all of Wako, Japan

[73] Assignee: Honda Giken Kogyo Kabushiki Kaisha, Tokyo, Japan

[21] Appl. No.: 08/956,649

[22] Filed: Oct. 23, 1997

[30] Foreign Application Priority Data

Oct. 25, 1996 [JP] Japan .................................. 8-283528
Oct. 25, 1996 [JP] Japan .................................. 8-283529

[51] Int. Cl.⁶ .................................................. B60R 21/20
[52] U.S. Cl. ...................................... 280/730.2; 280/728.3
[58] Field of Search ............................. 280/728.3, 730.2

[56] References Cited

U.S. PATENT DOCUMENTS

| | | | |
|---|---|---|---|
| 5,498,030 | 3/1996 | Hill et al. ............................... | 280/743.1 |
| 5,556,127 | 9/1996 | Hurford et al. . | |
| 5,749,597 | 5/1998 | Saderholm ............................ | 280/730.2 |
| 5,860,673 | 1/1999 | Hasegawa et al. ................... | 280/730.2 |
| 5,893,579 | 4/1999 | Kimura et al. ....................... | 280/730.2 |

FOREIGN PATENT DOCUMENTS

WO 96/30234  10/1996  WIPO .

*Primary Examiner*—Kenneth R. Rice
*Attorney, Agent, or Firm*—Armstrong, Westerman, Hattori, McLeland & Naughton

[57] ABSTRACT

A module case is provided in which an air bag module is housed. The air bag module is arranged inside of a seat back of a seat of a motor vehicle and the lid of the module case is opened by a pressure of an air bag which inflates at the side collision of the motor vehicle, so as to deploy the air bag from the lid into a passenger compartment of the vehicle. Even when the lid has become unopenable due to the depression thereof by a door deformed by the shock of the collision, tear lines formed in a case body of the module case are torn to turn a front wall of the case body in a direction towards the front of the vehicle, and hence, the air bag can be deployed from the front wall part of the case body into the passenger compartment without hindrance.

3 Claims, 9 Drawing Sheets

AIR BAG APPARATUS

BACKGROUND OF THE INVENTION

1. Field of the Invention

The present invention relates to an air bag apparatus which protects the occupant of a motor vehicle in the event of a side collision thereof in such a way that an air bag is deployed into the passenger compartment of the vehicle from an air bag module arranged inside of a seat back of a seat of the vehicle.

2. Description of the Related Art

An air bag apparatus for coping with the side collision of a motor vehicle is known. For example, U.S. Pat. No. 5,498,030 discloses such an air bag apparatus. In the prior art apparatus shown in that patent, an air bag module is arranged inside of a seat back by being enclosed within a pouch made of fabric. An air bag, included in the air bag module, breaks through a sewn portion of a covering member of the seat back by means of the inflating pressure thereof, and the air bag is deployed into the passenger compartment of the vehicle through an opening formed in the sewn portion.

Meanwhile, a force, caused by an occupant of the vehicle leaning his/her back against the seat back, is transmitted to the air bag module through the covering member and pad of the seat back. In this regard, the mere enclosure of the air bag module in the fabric pouch is not sufficiently reliable to protect the inflator, the air bag, the harness, etc., which form the air bag module from the force of the occupant's back against the seat back. In a case where the air bag module is housed within a module case formed of a hard material such as synthetic resin, and where the air bag is inflated by opening or lifting a lid which is provided in the module case so as to be capable of opening, the air bag module is more likely to be protected. Moreover, in this case, the air bag can be reliably deployed in a predetermined direction through an open space formed by the opening of the lid.

However, when any one of the door and center pillar between two doors of the vehicle is deformed toward the interior of the vehicle passenger compartment by the side collision, and has come into contact with the side surface of the seat back, the lid of the module case will be pressed upon by a force and made unopenable by the pressing force of the contacting part, and the air bag will not smoothly inflate.

Besides, when the sewn portion of the covering member is torn by the inflation of the air bag, the inflating pressure of the air bag needs to be concentrated on the sewn portion. Herein, unless the covering member is fixed in place, the shift or elongation deformation of the covering member will make it impossible to concentrate the pressure on the sewn portion so that the sewn portion cannot be torn reliably every time. Further, in a case where the covering member is constructed of a trim cover located on an outer side thereof, a wadding cover located on an inner side thereof and a wadding sandwiched in between the trim cover and the wadding cover, a wadding cover, which is formed of a material softer than the material of the trim cover as is the case in the prior art, poses the problem that only the wadding cover is readily deformed or torn by the inflating pressure of the air bag so that the pressure cannot be concentrated on the sewn portion. Also, when the trim cover is formed of a material which easily elongates, the same problem that the pressure cannot be concentrated on the sewn portion occurs.

SUMMARY OF THE INVENTION

The present invention has been made in view of the circumstances stated above, and it has for its object to reliably deploy an air bag into a vehicle passenger compartment from an air bag module arranged inside of a seat back of a seat of the motor vehicle, at the time of a side collision of the motor vehicle.

In order to accomplish the above-stated object, according to the first feature of the present invention, an air bag apparatus is proposed, wherein an air bag module, which is housed in a case body of a module case, is arranged inside of a seat back of the motor vehicle. A lid, which covers an open part of the case body, is opened by a pressure of an air bag which inflates from within the air bag module. A sewn portion at which a front covering member and a side covering member covering a front surface and a side surface of the seat back, respectively, are integrally sewn up, is torn by the pressure. The air bag is deployed into a vehicle passenger compartment through an opening which has been formed at the sewn portion. The air bag apparatus is characterized in that a wall of the case body is formed with tear lines, which are torn by the pressure of the inflating air bag, whereby the wall can be opened in a direction different from an opening direction of the lid.

Because of the above-described feature, even when the lid has been made unopenable by the pressure from any one of a door and a center pillar between two doors of a vehicle which has been deformed due to the side collision of the vehicle, the tear lines are torn to open the partition wall, whereby the air bag can be inflated without hindrance.

Further, according to the second feature of the present invention, an air bag apparatus is proposed, wherein an air bag module is arranged inside of a seat back of a seat of the motor vehicle, and a sewn portion, at which a front covering member and a side covering member covering a front surface and a side surface of the seat back, respectively, are integrally sewn up, is torn by a pressure of an air bag which inflates from within the air bag module. The air bag is deployed into a vehicle passenger compartment through an opening which has been formed at the sewn portion. The air bag apparatus is characterized in that those end parts of the front covering member and the side covering member which are opposite to the sewn portion are coupled to a seat frame which forms a skeleton of the seat back of a seat of the motor vehicle.

Because of the above-described feature, when the inflating pressure of the air bag has inflated the air bag, the front covering member and the side covering member cannot escape in a direction moving away from the air bag, and the pressure is concentrated on the sewn portion to reliably tear the sewn portion.

Still further, according to the third feature of the present invention, an air bag apparatus is proposed, wherein an air bag module is arranged inside of a seat back of a seat of the motor vehicle. Each of a front covering member and a side covering member, which cover a front surface and a side surface of the seat back, respectively, is constructed of a trim cover located on an outer side thereof, a wadding cover located on an inner side thereof, and a wadding is sandwiched in between the trim cover and the wadding cover. A sewn portion, at which the front covering member and the side covering member are integrally sewn up, is torn by the inflating pressure of an air bag, which inflates from within the air bag module. The air bag is deployed into a vehicle passenger compartment through an opening which has been formed at the sewn portion. The air bag apparatus is characterized in that the wadding cover of each of the front covering member and the side covering member is formed of the same material as the material of the trim cover.

Because of the above-described feature, when the inflating pressure of the air bag has inflated the air bag, the elongation deformation of only the wadding cover located on the inner side is avoided, and the pressure can be concentrated on the sewn portion to reliably tear the sewn portion. Incidentally, to form the trim cover and the wadding cover out of the same type of materials does not signify that the colors and substances of the materials are completely identical, but it does signifies that the strengths and rigidities of the materials are essentially equal.

The above-stated and other objects, features and advantages of the present invention will become apparent from the description of a preferred embodiment to be detailed below in conjunction with the accompanying drawings.

BRIEF DESCRIPTION OF THE DRAWING FIGURES

FIGS. 1–10 illustrate one embodiment of the present invention, wherein:

FIG. 1 is a perspective view of a seat which is furnished with an air bag apparatus;

FIG. 2 is an enlarged cross-sectional view taken along line 2—2 indicated in FIG. 1;

FIG. 3 is an enlarged view taken in the direction of arrow 3 indicated in FIG. 2;

FIG. 4 is an enlarged view taken in the direction of arrow 4 indicated in FIG. 2;

FIG. 5 is an enlarged view taken in the direction of arrow 5 indicated in FIG. 2;

FIG. 6 is a cross-sectional view taken along line 6—6 indicated in FIG. 5;

FIG. 7 is a cross-sectional view taken along line 7—7 indicated in FIG. 5;

FIG. 8 is a perspective view of a module case; and

FIGS. 9 and 10 are views for explaining the operation of the air bag apparatus at the deployment of an air bag.

DESCRIPTION OF THE PREFERRED EMBODIMENT

Figure 1:
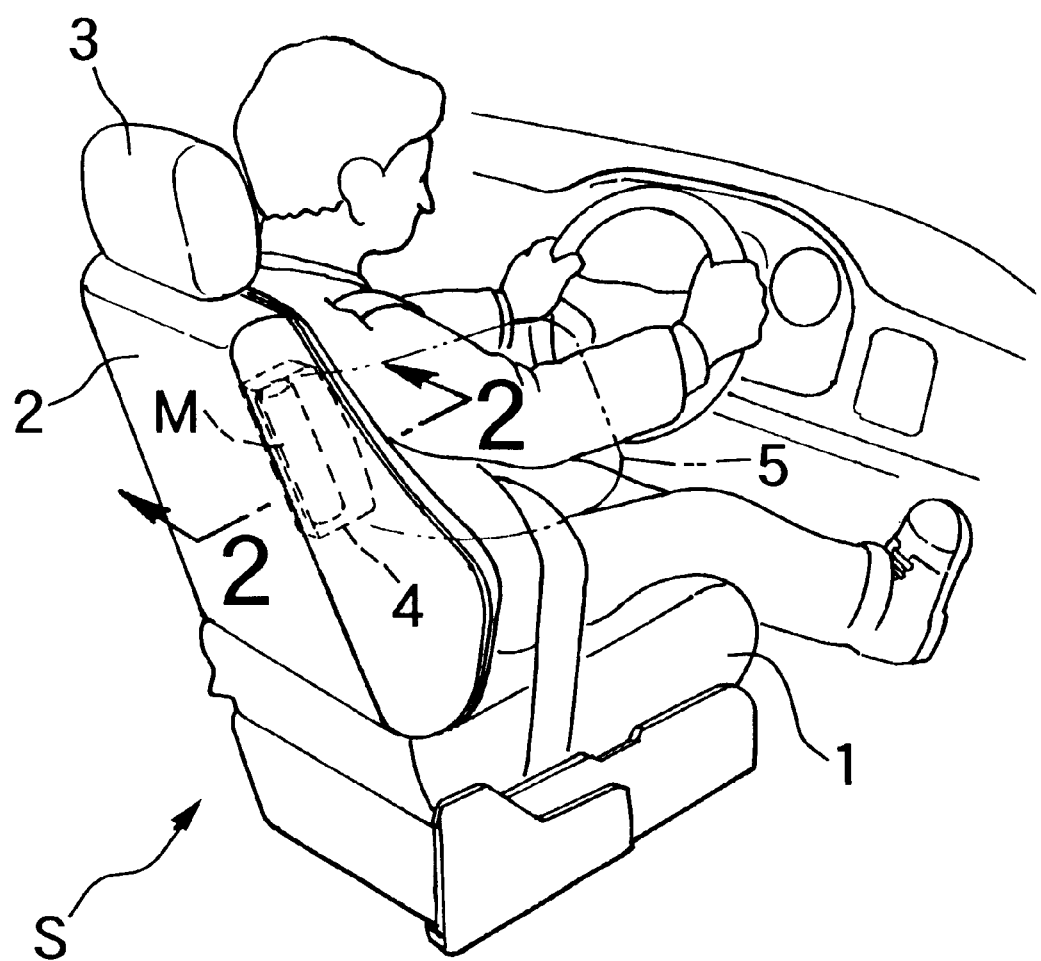

As shown in FIG. 1, a seat S for the driver of an automobile is constructed of a seat cushion 1 which is arranged to be substantially horizontal, a seat back 2 which extends upwardly and is inclined towards the rear end of the vehicle from the bottom to the top of the seat cushion 1, and a head rest 3 which is mounted on the upper end of the seat back 2. An air bag module M, housed within a module case 4, is arranged inside the right side of the seat back 2. In the operation of the air bag module M, an air bag 5 tears open a sewn portion 21 of the seat back 2 and is deployed forwardly at an oblique angle so as to block the right side of the occupant sitting on the seat S, from the left side of the right front door 6 (refer to FIGS. 9 and 10) of the vehicle.

Figure 2:
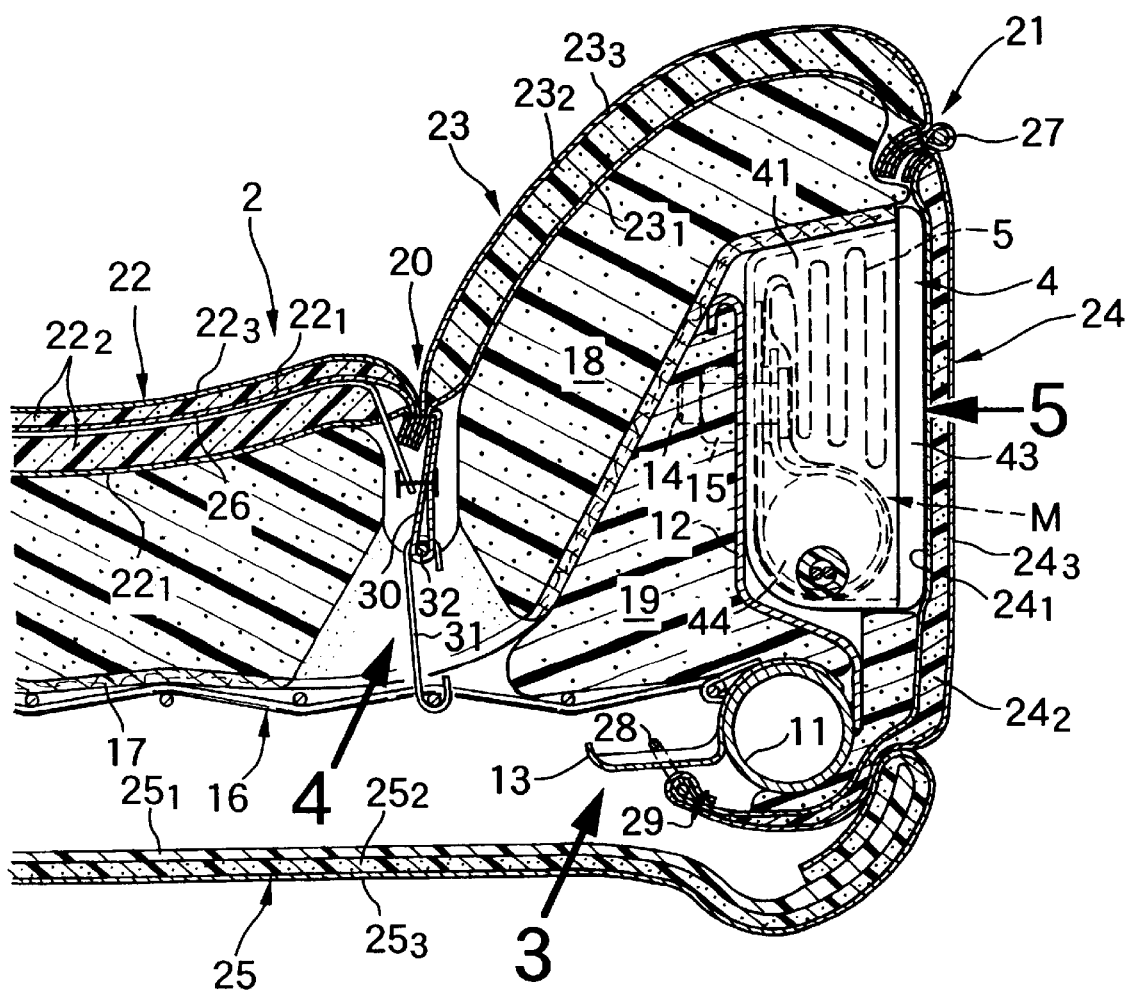

As seen from the cross-section of the seat back 2 shown in FIG. 2, a module mounting bracket 12, which is made of metal, extends forwardly of the body of the automobile. Six retainers, which are made of metal, extend inwardly of the car body. The six retainers 13 are fixed by means of being welded to a pipe frame 11 which extends in upward and downward directions along the right side edge of the seat back 2. The air bag module M, housed within the module case 4, is fixed to the right side surface of the module mounting bracket 12 by two bolts 14, 14 and corresponding nuts 15, 15. A spring 16 is shown in a stretched condition, a first end of the spring 16 being connected to an inward part of the outer periphery of the pipe frame 11. Herein, a shape keeping member 17, made of a rough wool cloth, and a pad 18, made of sponge, are arranged so as to spread from the front surface of the spring 16 to the front surface of the module case 4. Also, a pad 19, made of sponge, is arranged in a region which is surrounded by the spring 16, the shape keeping member 17 and the module case 4. The shape keeping member 17 prevents the spring 16 from deforming the pad 18. The pipe frame 11 and the spring 16 form part of a seat frame.

The front central part of the seat back 2 is covered with a first covering member 22, while the upper part and both the right and left side parts of the first covering member 22 are covered with a second covering member 23. Further, the upper surface and both the right and left side surfaces of the seat back 2, which are contiguous to the second covering member 23, are covered with a third covering member 24. Besides, the rear surface of the seat back 2 is covered with a fourth covering member 25 which is constructed so that the surface of a resin plate $25_1$ is covered with a wadding $25_2$ made of sponge and a trim cover $25_3$ made of leather or cloth.

The first covering member 22, second covering member 23 and third covering member 24 have substantially the same structures, and they are constructed of wadding covers $22_1$, $23_1$, $24_1$, respectively, which abut the pad 18, waddings of thin sponge $22_2$, $23_2$, $24_2$, respectively, which are integrally coupled with the front surfaces of the wadding covers $22_1$, $23_1$, $24_1$, respectively, and trim covers of leather or cloth $22_3$, $23_3$, $24_3$, respectively, which are placed on the front surfaces of the wadding $22_2$, $23_2$, $24_2$, respectively. Only the first covering member 22, however, has the wadding $22_2$ divided into two layers, between which a further wadding cover $22_1$ and a heater 26 are sandwiched.

The first covering member 22 and the second covering member 23 are sewn up at a sewn portion 20, while the second covering member 23 and the third covering member 24 are sewn up at the sewn portion 21 having a piped edge 27. The sewn portion 21 facing the vicinity of the front end of the module case 4 tears at the time of the operation of the air bag module M, and the air bag 5 deploys through an opening 45 (refer to FIGS. 9 and 10) formed by the tearing of the sewn portion 21. Ordinarily, the wadding covers $22_1$, $23_1$, $24_1$, are formed of a comparatively soft material. In this embodiment, however, the wadding covers $23_1$, $24_1$ of the second covering member 23 and third covering member 24, respectively, which are sewn up at the sewn portion 21, are formed of a material which is harder than the ordinary material. In other words, the harder material is the same as the material of the trim covers $23_3$, $24_3$ of the members 23 and 24, respectively.

Figure 3:
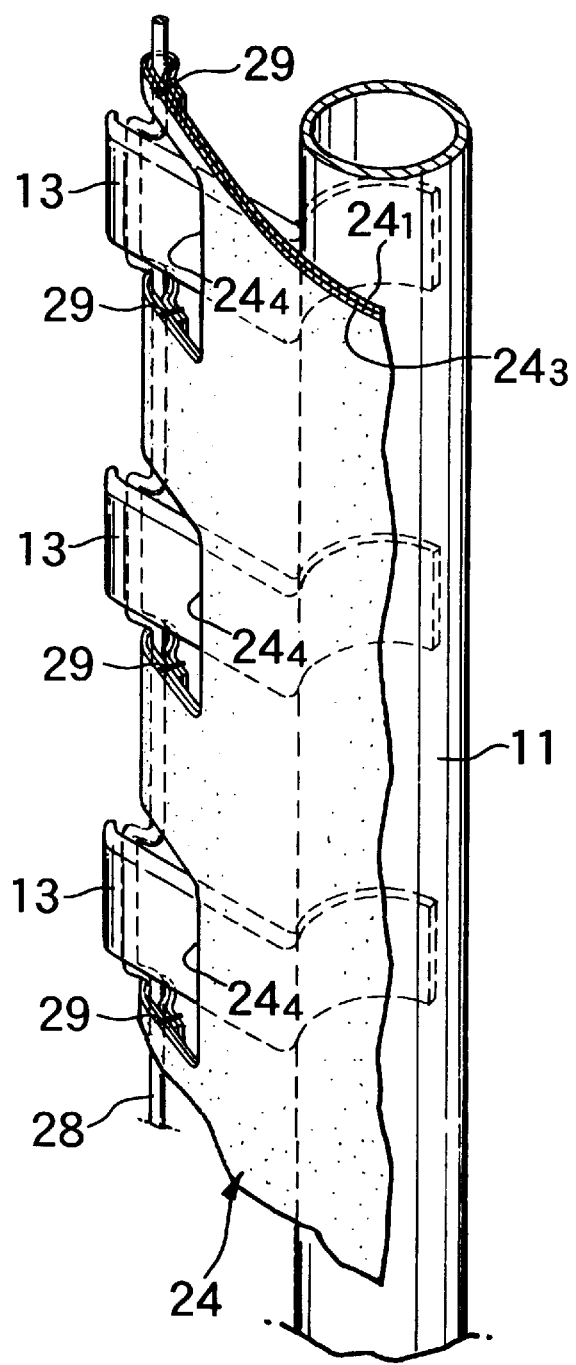

As seen from FIGS. 2 and 3, the rear end part, of the third covering member 24 at which the trim cover $24_3$ and wadding cover $24_1$ are placed one over the other, is wound around a wire piece of stainless steel 28 and is sewn on at sewn portions 29, along which six engagement cutouts or recesses $24_4$ (only three of them are shown in FIG. 3) are formed. Thus, those parts of the wire piece 28 which are exposed outside the engagement cutouts $24_4$ are held in hooked engagement with the retainers 13 in the state in which the rear end part of the third covering member 24 is strongly pressed against the rear surface of the pipe frame 11.

Figure 4:
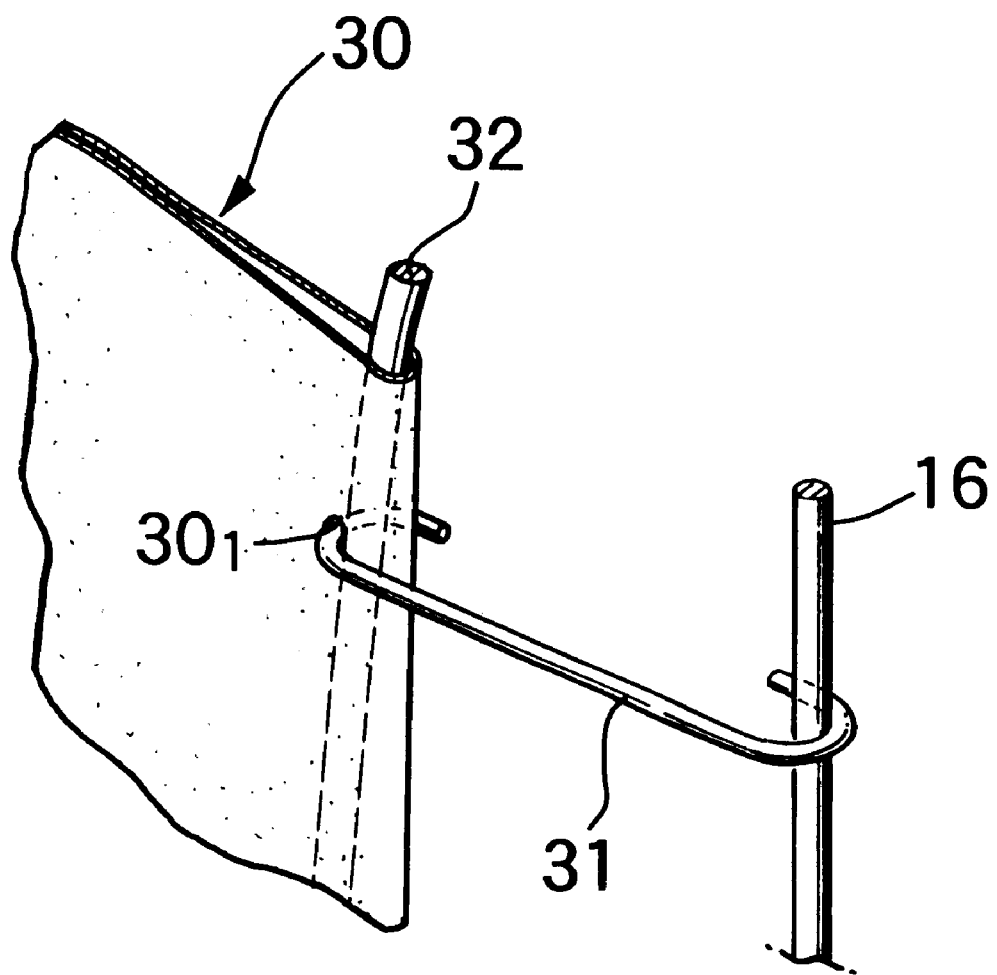
Figure 5:
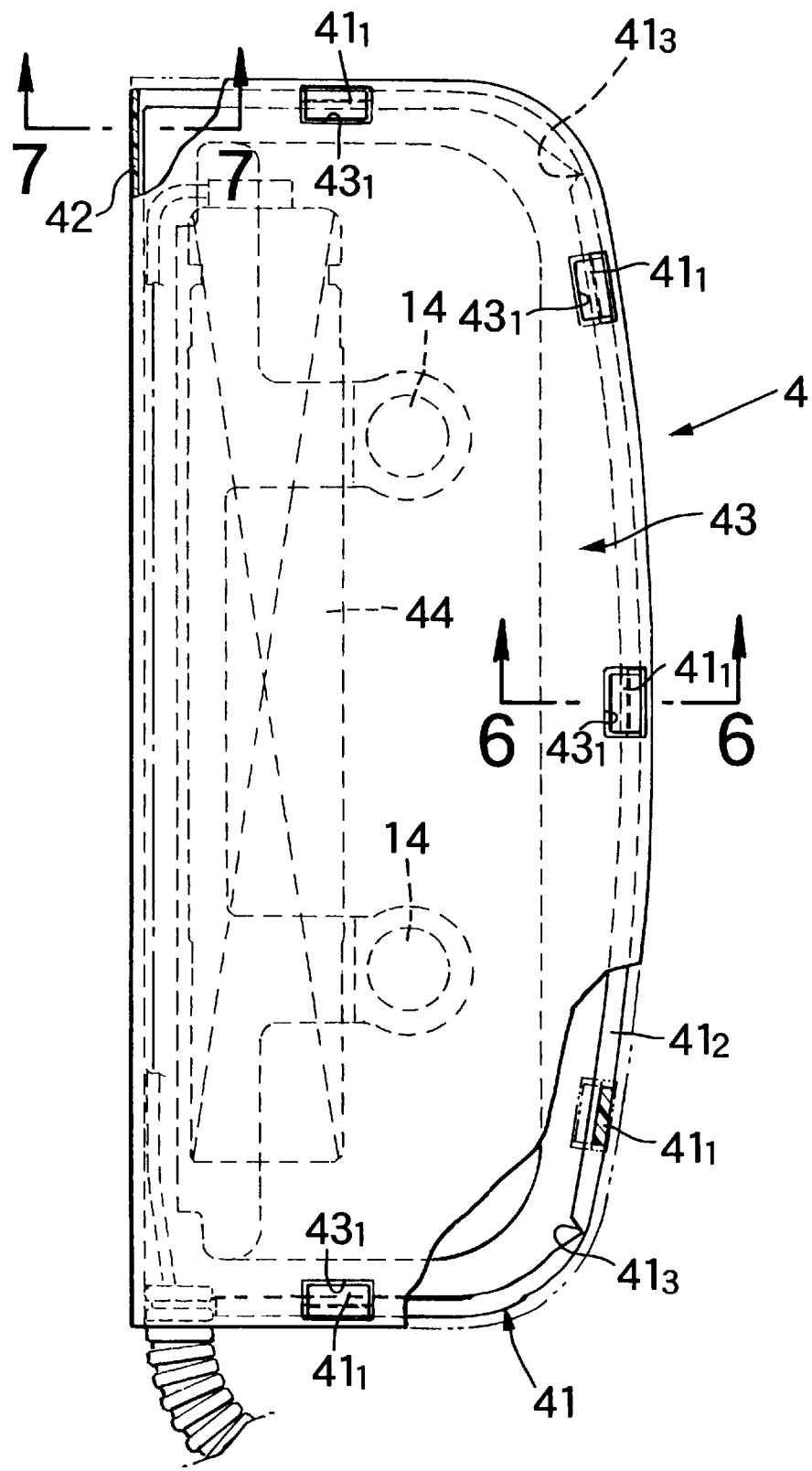
Figure 6:
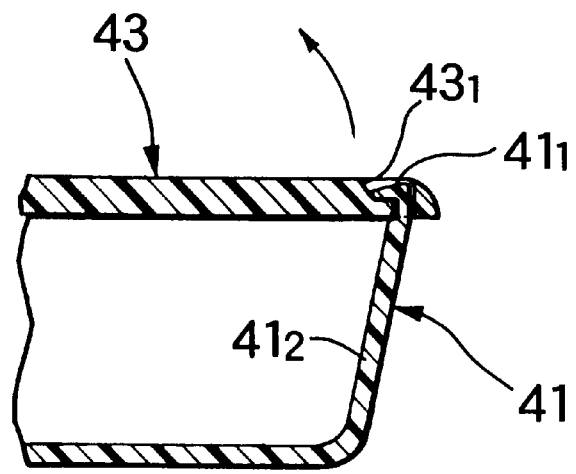
Figure 7:
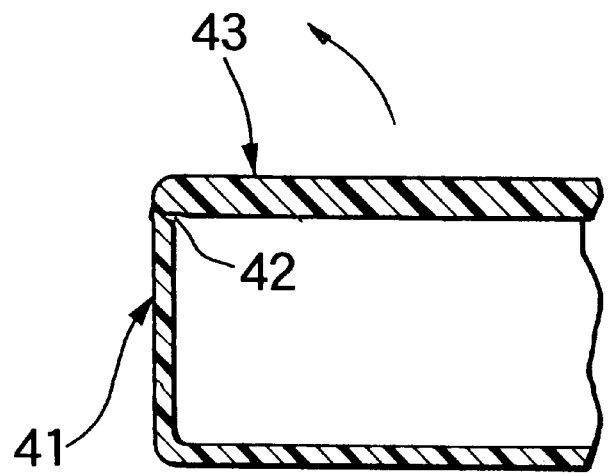
Figure 8:
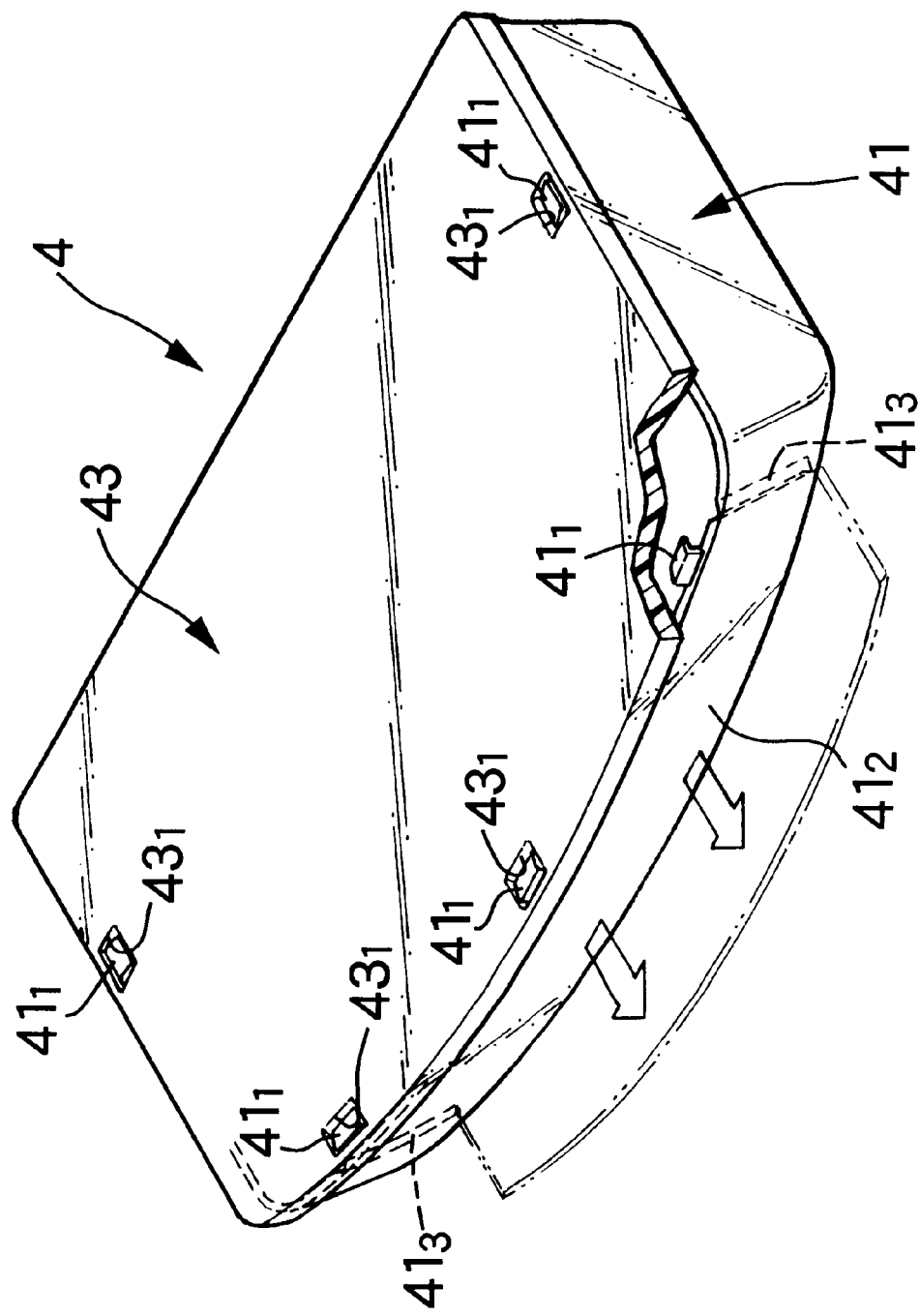

As seen from FIGS. 2 and 4, a suspension member 30, formed by folding in half a beltlike material of high strength such as tricot, is sewn so as to become integral with the sewn portion 20 of the first covering member 22 and the second covering member 23. A wire piece of stainless steel 32 is received in the suspension member 30. Herein, one end of each of three metal hooks 31 is held in hooked engagement with the wire piece 32 and the corresponding one of three pairs of engagement holes $30_1$ (only one of which is clearly shown in FIG. 4) are formed along the end edge of the suspension member 30. Besides, the other end of each of the hooks 31 is held in hooked engagement with the spring 16.

Next, the structure of the module case 4 will be described in conjunction with FIGS. 5–8. The module case 4 is unitarily molded of a synthetic resin. The module case 4 includes a case body 41, which is in the shape of a shallow container, and a lid 43, which is connected to the case body 41 through a thin-walled hinge 42 so as to be openable (refer to FIGS. 5 and 7). Five hooks $41_1$ formed in the open part of the case body 41 are held in engagement with five engagement holes $43_1$ formed in the lid 43, whereby the lid 43 is fixed at a position adapted to cover the open part of the case body 41. When a pressure under which the air bag 5 inflates pushes the inner surface of the lid 43, the hooks $41_1$ are elastically deformed to disengage from the engagement holes $43_1$ whereby the lid 43 is turned to a position adapted to open the open part of the case body 41.

When the module case 4 has been installed inside the seat back 2, the lid 43 lies in contact with the inner surface of the wadding cover $24_1$ of the third covering member 24, and the front wall $41_2$ of the case body 41 lies in contact with the rear surface of the shape keeping member 17. A line, along which the front edge of the lid 43 contacts the front wall $41_2$, extends in parallel with the sewn portion 21 in the vicinity of the sewn portion 21. In addition, two tear lines $41_3$, $41_3$ (refer to FIGS. 5 and 8), which are thin-walled and which extend in the lateral direction of the body of the motor vehicle, are formed at the upper part and at the end part of the inner surface of the front wall $41_2$ of the case body 41, respectively.

The module M, housed within the module case 4, is comprised of an inflator 44, which generates a high pressure gas when ignited by a signal from an acceleration sensor (not shown), and the air bag 5, which inflates when fed with the high pressure gas from the inflator 44.

Next, the operation of the embodiment of the present invention having the above-described construction will be discussed.

Figure 9:
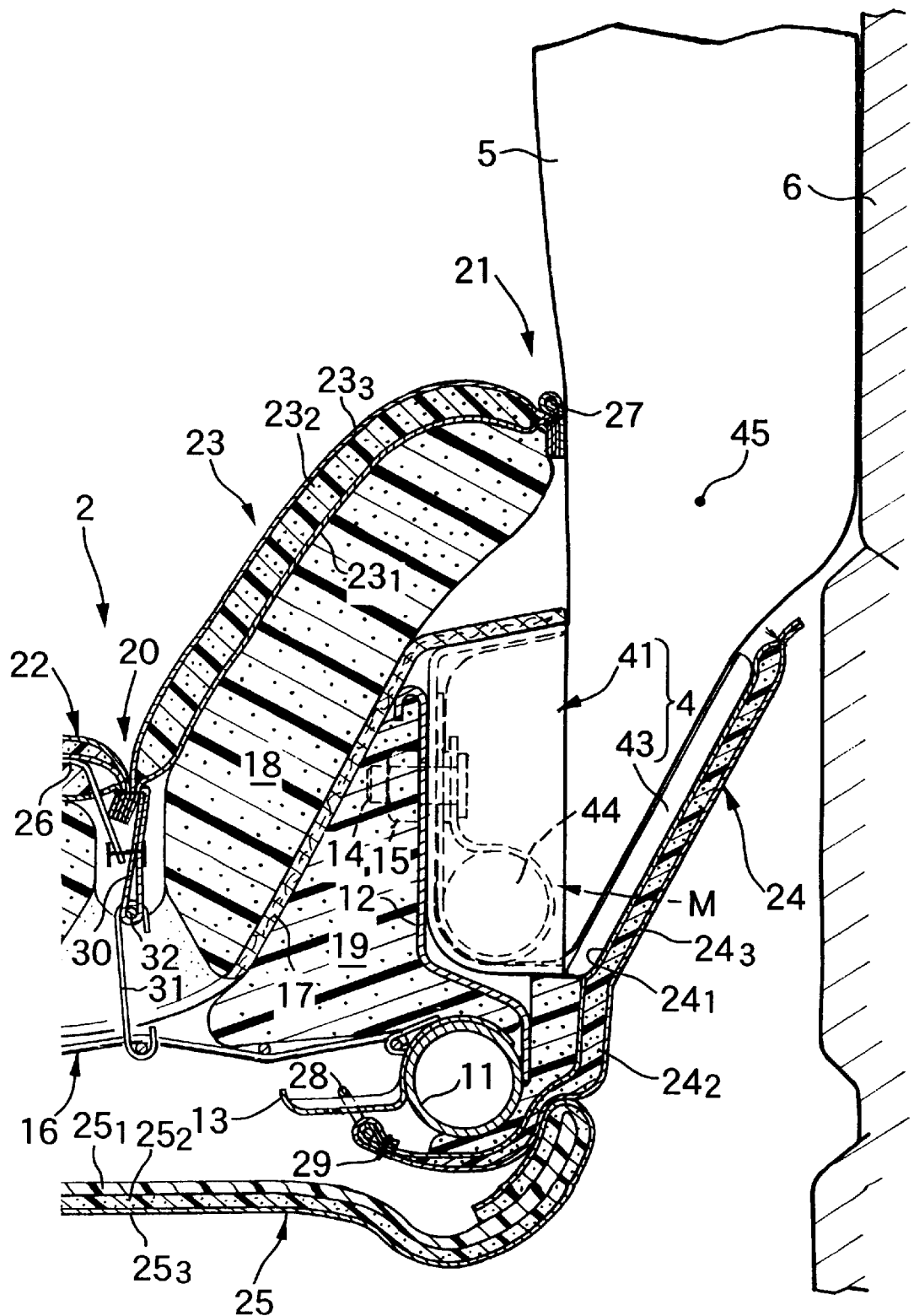

When a lateral acceleration of a predetermined value or higher has been detected at the side collision of the motor vehicle, the inflator 44 of the air bag module M is ignited to generate the high pressure gas, by which the air bag 5 is inflated. When the hooks $41_1$, of the case body 41, have disengaged from the engagement holes $43_1$ of the lid 43 under the inflating pressure of the air bag 5, the lid 43 turns the hinge 42 around relative to the case body 41 and presses the inner surface of the third covering member 24 outwardly. Then, a heavy load acts on the sewn portion 21 of the third covering member 24 and second covering member 23. Therefore, as shown in FIG. 9, the sewn portion 21 tears to integrally turn both the lid 43 and the third covering member 24, and the air bag 5 is deployed through the opening 45 formed at the sewn portion 21, so as to prevent the occupant of the motor vehicle from contacting the inner surface of the door 6.

For the purpose of reliably tearing the sewn portion 21 in the operation of the air bag module M, the pressure of the inflating air bag 5 needs to be effectively transmitted to the sewn portion 21. It is necessary therefor that the second covering member 23 and the third covering member 24 have satisfactory tensions, and that the wadding covers $23_1$, $24_1$ have satisfactory hardnesses. In a case where the tensions of the second covering member 23 and the third covering member 24 are low, the third covering member 24, when pressed by the lid 43, flexes with ease so as to escape from the lid 43, and the second covering member 23, pulled by the third covering member 24, also flexes with ease. Thus, it becomes difficult to concentrate the load on the sewn portion 21.

Besides, when the wadding cover $24_1$ of the third covering member 24 is excessively soft, the wadding cover $24_1$ and the wadding $24_2$ become concave or indented at the time the lid 43 turns. Therefore, the load from the lid 43 is difficult to transmit to the sewn portion 21 through the trim cover $24_3$. Further, when the wadding cover $23_1$ of the second covering member 23 is excessively soft, the wadding cover $23_1$ and the wadding $23_2$ of the second covering member 23 flex with ease when the second covering member 23 is pulled by the third covering member 24. Therefore, the second covering member 23 fails to resist the tensile force of the third covering member 24, and it becomes difficult to transmit the load from the lid 43 to the sewn portion 21.

According to this embodiment, however, the end part of the second covering member 23, which lies opposite to the sewn portion 21, is elastically held in hooked engagement with the spring 16 through the suspension member 30, as well as the hooks 31 and the end part of the third covering member 24, which lies opposite to the sewn portion 21, is securely coupled to the retainers 13 welded to the pipe frame 11, so that the second covering member 23 and the third covering member 24 can be satisfactorily tensioned. Moreover, a material of a higher than normal rigidity, i.e., the same material as that of the second trim cover $23_3$ and third trim cover $24_3$, is used for the second wadding cover $23_1$ and third wadding cover $24_1$, so that the second wadding cover $23_1$ and third wadding cover $24_1$ are difficult to flex and the load is effectively transmitted to the sewn portion 21.

Figure 10:
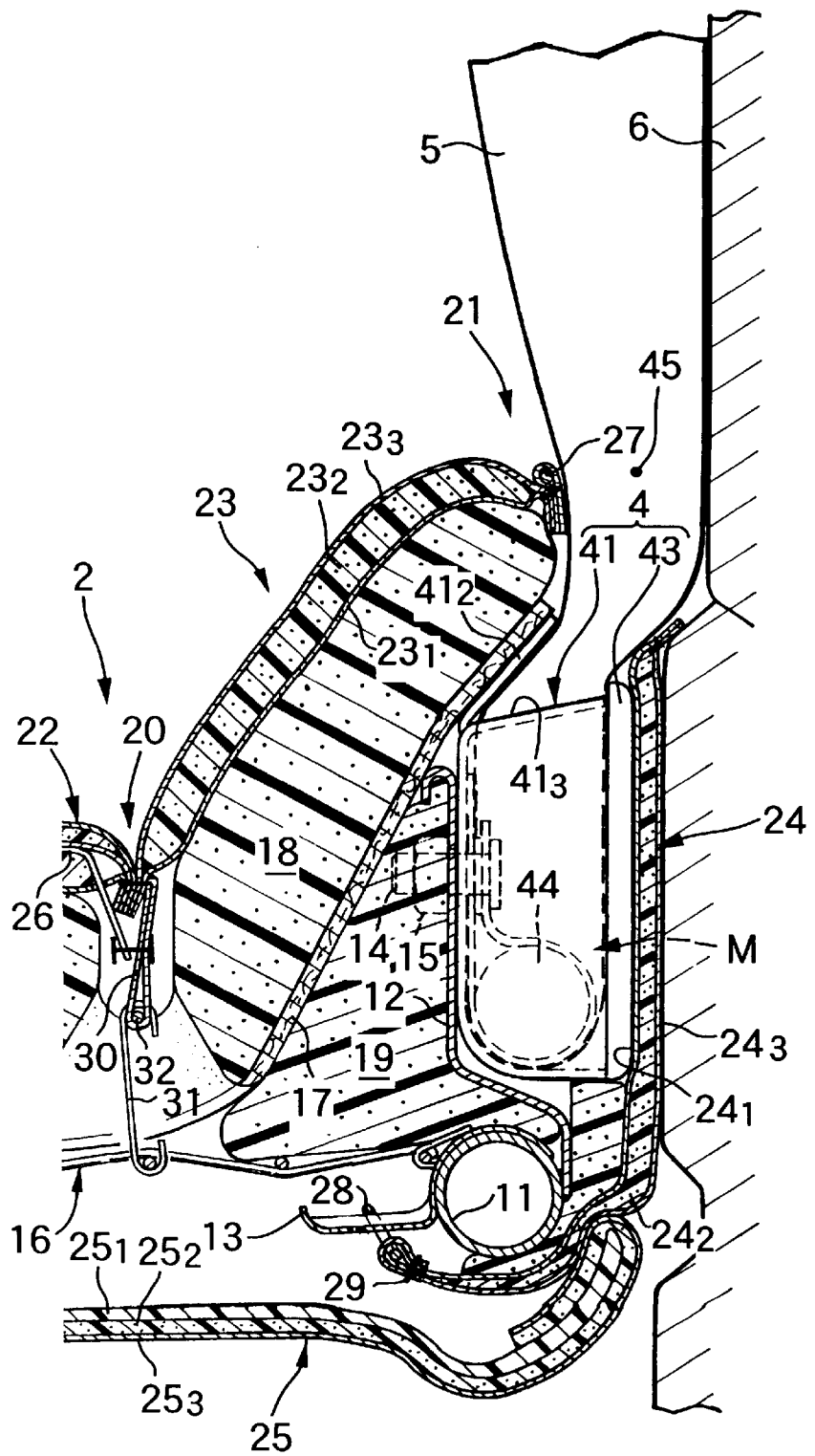

Meanwhile, in a case as shown in FIG. 10, where the vehicle has undergone the side collision from the right side and where the right front door 6 has been deformed so as to approach the seat S, the clearance between the inner surface of the right front door 6 and the outer surface of the third covering member 24 decreases to make the lid 43 unopenable sometimes. However, when the pressure of the inflating air bag 5 has acted on the front wall $41_2$ of the case body 41, the two tear lines $41_3$, $41_3$ tear to turn the front wall $41_2$ towards the front (refer to dashed lines in FIG. 8). Thus, even when the lid 43 of the module case 4 has become incapable of turning, the air bag 5 can be inflated through an open part by the turning of the front wall $41_2$ to tear the sewn portion 21 and to deploy the air bag 5 along the inner surface of the right front door 6 without hindrance.

While the embodiment of the present invention has thus far been described in detail, the present invention can be subjected to various design or alterations within a scope not departing from the purport thereof.

By way of example, although in the embodiment the tear lines $41_3$, $41_3$ of the module case 4 are formed in the inner surface of the front wall $41_2$, the tear lines $41_3$, $41_3$ can be formed in any one of the outer surface of the front wall $41_2$ and in both the inner and outer surfaces of the front wall $41_2$. Further, the tear lines $41_3$, $41_3$ can be formed of any one of small slits, small perforations and a large number of adjacent apertures, which are provided consecutively throughout small intervals.

In the embodiment, in order to reliably tear the sewn portion 21, the ends of both the second covering member 23 and third covering member 24 are coupled with the seat frame so as to increase the tensions, and the same material as the material of the second and third trim covers $23_3$, $24_3$ is used for the second and third wadding covers $23_1$, $24_1$. However, a satisfactory action and effect can be attained even with only one or the other of the functions.

What is claimed is:

1. An air bag apparatus comprising:

an air bag module which is housed in a case body of a module case and which is arranged inside of a seat back of a seat of a vehicle;

a lid which covers an open part of said case body and which is opened by a pressure of an air bag which inflates from within said air bag module; and a sewn portion, at which a front covering member and a side covering member cover a front surface and a side surface of the seat back, respectively, are integrally sewn up, is torn by said pressure, wherein said air bag is deployed into a vehicle passenger compartment through an opening which has been formed at said sewn portion, and wherein a wall of said case body is formed with tear lines, which are torn by said pressure of said air bag when said air bag is inflated, whereby said wall can be opened in a direction different from an opening direction of said lid.

2. An air bag apparatus comprising:

an air bag module arranged inside of a seat back of a seat of a vehicle; and a sewn portion, at which a front covering member and a side covering member cover a front surface and a side surface of the seat back, respectively, are integrally sewn up, is torn by a pressure of an air bag which inflates from within said air bag module, said air bag being deployed into a vehicle passenger compartment through an opening which has been formed at said sewn portion, wherein end parts of said front covering member and said side covering member, which are opposite to said sewn portion, are coupled with a seat frame which forms a skeleton of said seat back.

3. An air bag apparatus comprising:

an air bag module arranged inside of a seat back of a seat of a vehicle;

a front covering member and a side covering member which cover a front surface and a side surface of said seat back, respectively, wherein said front covering member and said side covering member are each constructed of a trim cover located on an outer side thereof, a wadding cover located on an inner side thereof, and a wadding sandwiched in between said trim cover and said wadding cover; and a sewn portion at which said front covering member and said side covering member are integrally sewn up, said sewn portion being torn by a pressure of an air bag which inflates from within said air bag module, wherein said air bag is deployed into a passenger compartment of said vehicle through an opening which has been formed at said sewn portion and wherein said wadding cover of each of said front covering member and said side covering member is formed of a same material as a material of said trim cover.

* * * * *